United States Patent [19]

Ikeuchi et al.

[11] Patent Number: 4,945,232

[45] Date of Patent: Jul. 31, 1990

[54] ANGLE MEASURING DEVICE

[75] Inventors: Masayuki Ikeuchi; Kouichi Okamura, both of Himeji, Japan

[73] Assignee: Mitsubishi Denki Kabushiki Kaisha, Tokyo, Japan

[21] Appl. No.: 413,646

[22] Filed: Sep. 28, 1989

[51] Int. Cl.$^5$ .............................................. G01D 5/34
[52] U.S. Cl. .......................... 250/231.14; 250/237 G
[58] Field of Search ..................... 250/231 SE, 237 G; 341/3, 13

[56] References Cited

U.S. PATENT DOCUMENTS 4,604,521 8/1986 Takekoshi et al. ............ 250/231 SE
4,767,925 8/1988 Kawamoto ................... 250/231 SE

FOREIGN PATENT DOCUMENTS 219830 9/1986 Japan .

Primary Examiner—David C. Nelms
Assistant Examiner—Stephone B. Allen
Attorney, Agent, or Firm—Sughrue, Mion, Zinn, Macpeak & Seas

[57] ABSTRACT

An angle measuring device for measuring the turning angle of a crankshaft in an internal combustion engine in order to control the ignition timing, etc. thereof comprises: a rotating disc adapted to rotate in synchronization with the rotation of a crankshaft and having a plurality of slits formed along the circumference thereof; light-emitting elements arranged in the vicinity of the rotating disc; light-receiving elements adapted to receive light emitted from the light-emitting elements through the slits of the rotating disc; a signal processing circuit adapted to measure the turning angle of the rotating disc by processing signals output from the light-receiving elements; a power-source line for supplying power-source voltage to the signal processing circuit; a first diode whose anode and cathode are connected to the input terminal of the signal processing circuit and to the power source line, respectively; and a second diode whose anode and cathode are connected to a ground line and to the input terminal of the signal processing circuit, respectively.

4 Claims, 2 Drawing Sheets

ANGLE MEASURING DEVICE

BACKGROUND OF THE INVENTION

1. Field of the Invention

This invention relates to an angle measuring device, and in particular, to an angle measuring device for measuring the turning angle of a crankshaft in an internal combustion engine in order to control the ignition timing, etc. thereof.

2. Description of the Related Art

In order to control the ignition timing, etc. of an internal combustion engine, an angle measuring device is used which is adapted to emit a predetermined pulse in synchronization with rotations of the crankshaft of the engine. FIG. 1 shows an example of conventional devices of this type. The device shown comprises a shaft 1 which rotates in synchronization with the rotation of the crankshaft (not shown), a rotating disc 2 attached to the shaft 1, light-emitting elements 3 and 4, light-receiving elements 5 and 6, and an electronic circuit 7 including a semiconductor signal-processing circuit.

FIG. 2 is a plan view of the rotating disc 2 of FIG. 1. As shown in the drawing, a plurality of slits 8a and 8b are provided at predetermined intervals along the circumference of the rotating disc 2, respectively.

FIG. 3 is a circuit diagram schematically showing the signal processing section of the electronic circuit 7 of FIG. 1. The signal processing section shown includes an input terminal 9, a resistor 10 connected in series to the input terminal 9, a capacitor 11 one end of which is connected to the resistor 10 and the other end of which is grounded. The reference numeral 12 indicates a signal processing circuit connected to the one end of the capacitor 11 and comprising a transistor 12a, etc.

In this conventional angle measuring device, which has the above-described construction, the rotating disc 2 shown in FIG. 2 rotates by being driven by the shaft 1, in synchronization with the rotation of the associated crankshaft. Light is input to the light-receiving elements 5, 6 and causes them to emit signals only when slits 8a and 8b are positioned between them and the light-emitting elements 3, 4. These signals are applied to the input terminal 9 shown in FIG. 3 so as to be processed. However, when, in the signal processing section shown in FIG. 3, high-frequency surge noise due to ignition are superimposed on signals to be applied to the input terminal 9, an electric current flows to the ground through the resistor 10 and a diode between the base and emitter of the transistor 12a in the signal processing circuit 12. Due to the presence of the diode, an inverse electric current flow does not occur. As a result, the high-frequency noise is rectified and smoothed into pulses having a large width by the diode in the transistor 12a, the resistor 10 and the capacitor 11. That is, the impedance between the input terminal of the signal processing circuit 12 and the power source and the impedance between the input terminal and the ground are ill balanced. Therefore, a great noise which is polarized in either the positive or negative direction is generated, resulting in the signal processing circuit 12 being subject to malfunctions.

SUMMARY OF THE INVENTION

This invention has been contrived with a view to eliminating this problem. It is accordingly an object of this invention to provide an angle measuring device which is capable of preventing malfunctions attributable to high-frequency noise.

In accordance with this invention, there is provided an angle measuring device comprising: a rotating disc adapted to rotate in synchronization with the rotation of a crankshaft and having a plurality of slits formed along the circumference thereof; a light-emitting means arranged in the vicinity of the above-mentioned rotating disc; a light-receiving means adapted to receive light emitted from the above-mentioned light-emitting means through the slits of the above-mentioned rotating disc; a signal processing circuit adapted to measure the turning angle of the above-mentioned rotating disc by processing signals output from the above mentioned light-receiving means; a power-source line for supplying power-source voltage to the above-mentioned signal processing circuit; a first diode whose anode and cathode are connected to the input terminal of the above-mentioned signal processing circuit and to the above-mentioned power source line, respectively; and a second diode whose anode and cathode are connected to a ground line and to the input terminal of the above-mentioned signal processing circuit, respectively.

DESCRIPTION OF THE PREFERRED EMBODIMENTS

An embodiment of this invention will now be described with reference to the accompanying drawings.

Figure 1:
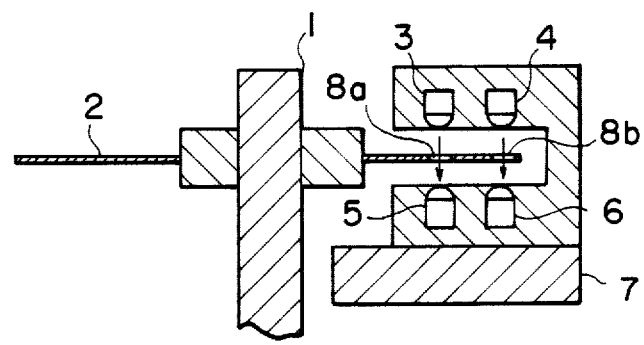
FIG. 1 is a schematic view of a conventional angle measuring device.
Figure 2:
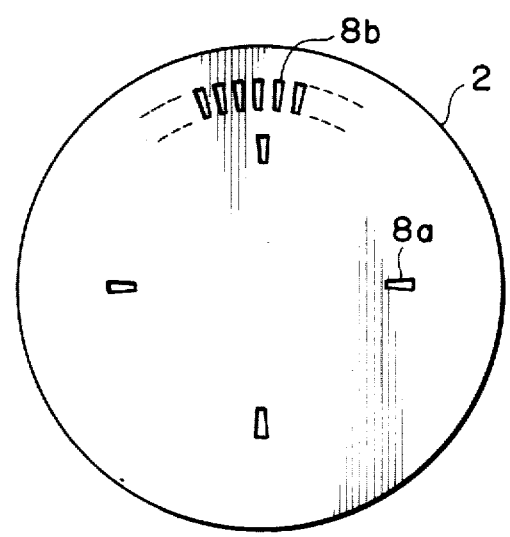
FIG. 2 is a plan view of the rotating disc used in the device of FIG. 1.
Figure 3:
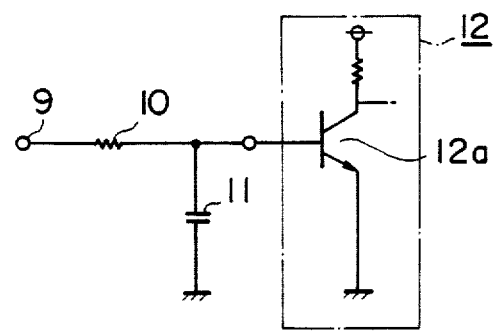
FIG. 3 is a circuit diagram of the signal processing section used in the device of FIG. 1.
Figure 4:
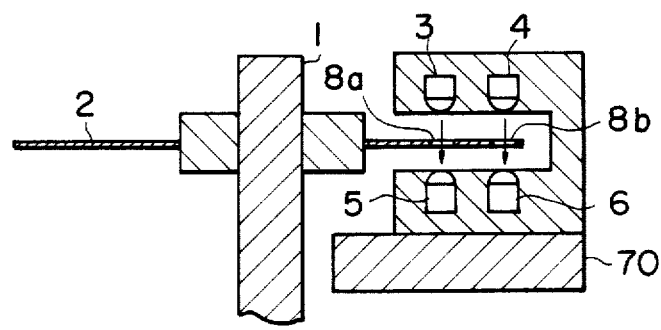
FIG. 4 is a schematic view of an angle measuring device in accordance with an embodiment of this invention.

Referring to FIG. 4, the embodiment shown includes a shaft 1 which rotates in synchronization with the crankshaft (not shown) of an internal combustion engine. Attached to this shaft 1 is a rotating disc 2 which, as shown in FIG. 2, has a plurality of slits 8a and 8b that are arranged at predetermined intervals along the circumference thereof, respectively. Light-emitting elements 3, 4 and light-receiving elements 5, 6 are arranged in such a manner that this rotating disc 2 is positioned between them, an electronic circuit 70 being electrically connected to these elements 3 to 6.

During operation, voltage is applied to the light-emitting elements 3 and 4 by the electronic circuit 70 so as to cause light to be emitted from these light-emitting elements 3 and 4, and the rotating disc 2 is rotated by the shaft 1 in synchronization with the crankshaft (not shown). Only when the slits 8a and 8b come, as a result of the rotation of the rotating disc 2, between the light-emitting and light-receiving elements 3 and 5, and, 4 and 6, respectively, the light emitted from the light-emitting elements 3 and 4 is input through the slits 8a and 8b to the light-receiving elements 5 and 6, thereby causing the light-receiving elements 5 and 6 to output electrical signals to the electronic circuit 70.

Figure 5:
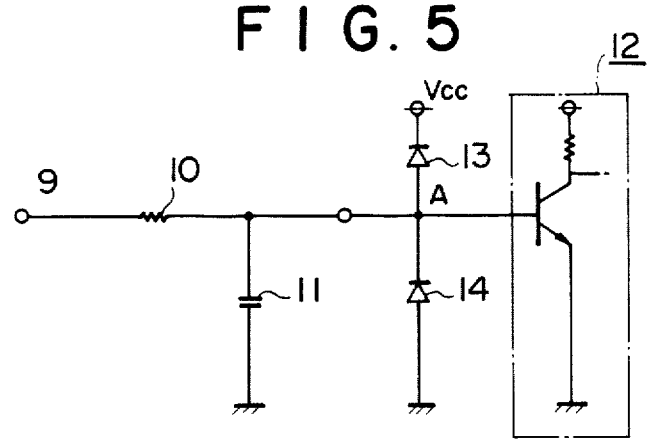
FIG. 5 is a circuit diagram of the signal processing section used in the embodiment of FIG. 4.

A signal processing section as shown in FIG. 5 is formed in the electronic circuit 70. This signal processing section includes an input terminal 9 and a resistor 10 one end of which is connected to the input terminal 9. Connected to the other end of the resistor 10 is the base of a transistor 12a in a signal processing circuit 12. A capacitor 11 is provided between the other end of the resistor 10 and the ground. Connected to a connection point A between the other end of the resistor 10 and the base of the transistor 12a in the signal processing circuit 12 are one end of the anode of a first diode 13 and the cathode of a second diode 14. The cathode of the first diode 13 is connected to a power-source line Vcc, and the anode of the second diode 14 is connected to a ground line. The first and second diodes 13 and 14 have substantially the same size so that their high-frequency characteristics, such as operating speed, may be approximately the same. The respective output terminals of the light-receiving elements 5 and 6 are connected to the input terminal 9.

The electrical signals output from the light-receiving element 5 or 6 are input through the input terminal 9 and the resistor 10 to the signal processing circuit 12, where they are processed to allow the turning angle of the rotating disc 2 to be measured. Since the high-frequency characteristics of the first and second diodes 13 and 14 connected to the connection point A are then substantially the same, the impedance between the input terminal of the signal processing circuit 12 and the power source and the impedance between this input terminal and the ground are well balanced. Accordingly, if a high-frequency noise due to ignition, etc. is superimposed on the electrical signals input through the input terminal, this noise is bypassed to the power source and the ground in both the positive and negative directions, so that the pulse width of the noise is not amplified. This helps to prevent malfunctions due to high-frequency noise, thereby improving the reliability of the device.

What is claimed is:

1. An angle measuring device comprising:
    a rotating disc adapted to rotate in synchronization with a crankshaft and having a plurality of slits formed along the circumference thereof;
    a light-emitting means arranged in the vicinity of said rotating disc;
    a light-receiving means adapted to receive light emitted from said light-emitting means through the slits of said rotating disc;
    a signal processing circuit adapted to measure the turning angle of said rotating disc by processing signals output from said light-receiving means;
    a power-source line for supplying power-source voltage to said signal processing circuit;
    a first diode whose anode and cathode are connected to the input terminal of said signal processing circuit and to said power source line, respectively; and
    a second diode whose anode and cathode are connected to a ground line and to the input terminal of said signal processing circuit, respectively.

2. A device as claimed in claim 1, wherein said first diode and said second diode have substantially the same high-frequency characteristics.

3. A device as claimed in claim 2, wherein said high-frequency characteristics comprise an operating speed.

4. A device as claimed in claim 1, wherein said signal processing circuit has an emitter-grounded transistor, the input terminal of said signal processing circuit being connected to the base of said transistor.

* * * * *